(12) United States Patent
Stewart

(10) Patent No.: US 8,095,893 B2
(45) Date of Patent: Jan. 10, 2012

(54) PROVIDING AN INTERACTIVE AND CUSTOMIZABLE ORGANIZATION TREE HAVING COMMUNICATION OPTIONS

(75) Inventor: Preston A. Stewart, Alpine, UT (US)

(73) Assignee: Xennsoft LLC, South Jordan, UT (US)

( * ) Notice: Subject to any disclaimer, the term of this patent is extended or adjusted under 35 U.S.C. 154(b) by 403 days.

(21) Appl. No.: 12/404,996

(22) Filed: Mar. 16, 2009

(65) Prior Publication Data
US 2010/0235751 A1    Sep. 16, 2010

(51) Int. Cl.
*G06F 3/048* (2006.01)
(52) U.S. Cl. .......................... 715/853; 715/751
(58) Field of Classification Search .............. 715/751, 715/752, 853, 759
See application file for complete search history.

(56) References Cited

U.S. PATENT DOCUMENTS

| | | | | |
|---|---|---|---|---|
| 5,414,809 A * | 5/1995 | Hogan et al. | ............. | 715/765 |
| 5,829,003 A * | 10/1998 | Okura | ............. | 1/1 |
| 7,418,448 B2 * | 8/2008 | Hensel et al. | ............. | 1/1 |
| 7,689,433 B2 * | 3/2010 | Chuah et al. | ............. | 705/1.1 |
| 7,729,935 B2 * | 6/2010 | Theiler | ............. | 705/7.27 |
| 2004/0181442 A1 * | 9/2004 | Hensel et al. | ............. | 705/7 |
| 2006/0005133 A1 * | 1/2006 | Lyle et al. | ............. | 715/708 |
| 2007/0136430 A1 * | 6/2007 | Qureshi et al. | ............. | 709/206 |
| 2007/0168885 A1 * | 7/2007 | Muller et al. | ............. | 715/853 |
| 2009/0043762 A1 * | 2/2009 | Shiverick et al. | ............. | 707/5 |
| 2009/0100321 A1 * | 4/2009 | Singh et al. | ............. | 715/205 |
| 2009/0228830 A1 * | 9/2009 | Herz et al. | ............. | 715/808 |
| 2010/0125779 A1 * | 5/2010 | Choudhury | ............. | 715/227 |

* cited by examiner

*Primary Examiner* — Omar Abdul-Ali
(74) *Attorney, Agent, or Firm* — Workman Nydegger

(57) ABSTRACT

A highly interactive directory tree can be provided through a client user interface. A user can access an organization's records through, for example, a web-based user interface on the client computer system. The user interface can be configured to display a directory tree of related member records in the organization, and can be further configured with a number of option controls. The option controls can be configured to allow a user to differentiate how some or all of the records in the directory tree are displayed at any given time, to define how many member records the directory tree displays, as well as how to view at-a-glance information for each member record. The option controls can further be configured to provide selective communications to specific members, or groups of filtered members in the directory tree.

28 Claims, 5 Drawing Sheets

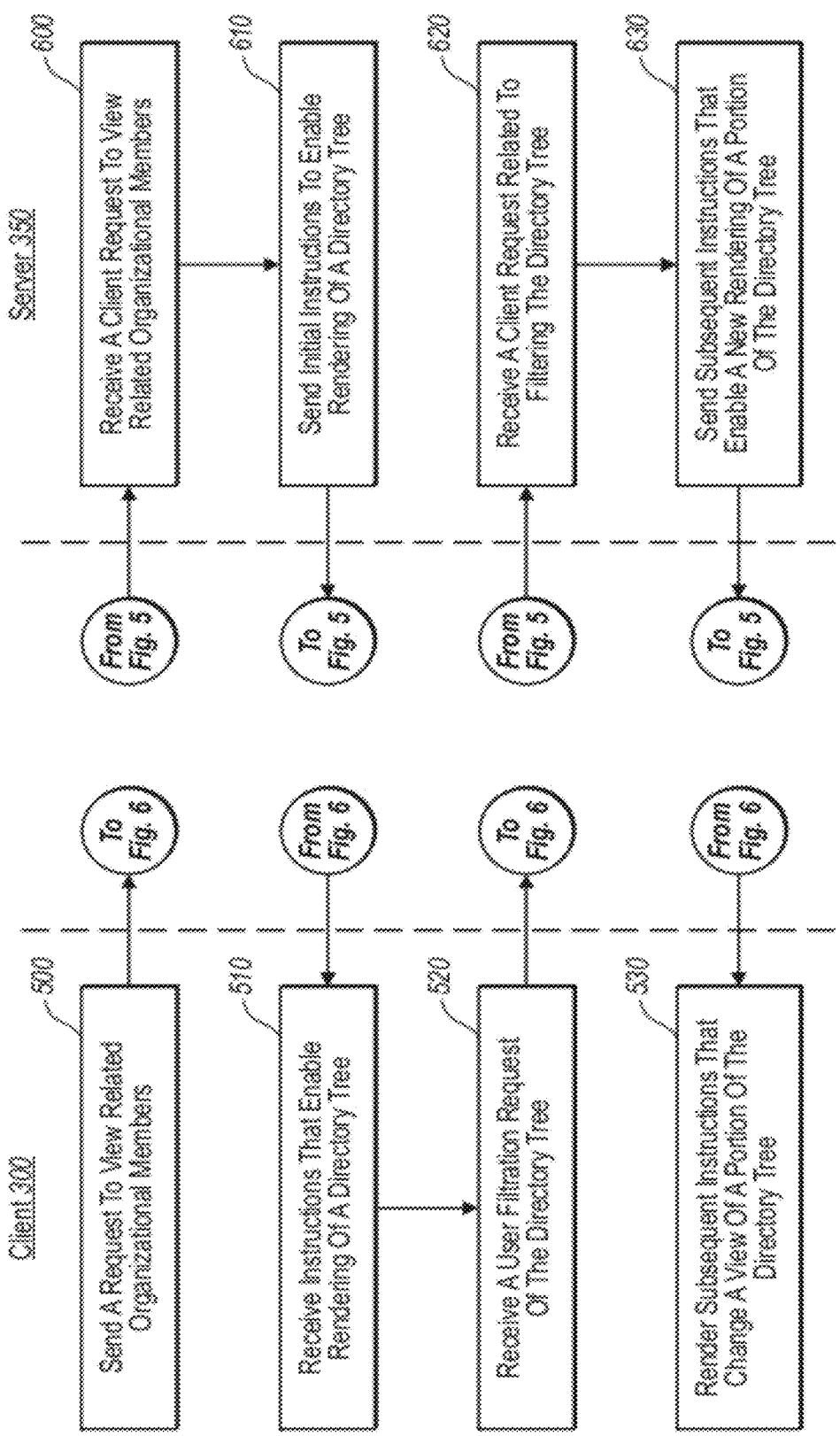

PROVIDING AN INTERACTIVE AND CUSTOMIZABLE ORGANIZATION TREE HAVING COMMUNICATION OPTIONS

CROSS-REFERENCE TO RELATED APPLICATIONS

N/A

BACKGROUND OF THE INVENTION

1. The Field of the Invention

This invention relates to systems, methods, and computer program products for displaying and/or interacting with organizational data.

2. Background and Relevant Art

Organizations increasingly use computerized systems to relay various bits of information to members of the organization, and/or customers. This information can take many forms, and often depends on the intended audience. For example, the organization may present products and other basic company information tailored to potential customers, but, with internal employees, the organization may present other types of information related to company management, contact information, work flows, sales or recruiting data, advancements, achievements, or the like. With the proliferation of computerized systems, it is increasingly common for organizations to provide both internal and external information through one or more computer-accessible local or wide-area network portals.

Internal information often takes the form of some directory information about its members or employees. Simple directory listings, however, may be less relevant or efficient than the working relationships various members have with each other. Thus, some directory information involves basic alphabetical name listings, while other directory listings may further comprise some basic search criteria for finding members (e.g., Distributors, Agents, etc.) by department, job title, etc. or relationships with other such members. In other cases, the organization may provide directory listings through an organizational tree, which may be a more natural way to look up information based on the company's structure and/or members' relationships with each other, and/or with other related groups of the same.

For example, some companies, particularly sales-oriented companies, are structured in such a way that one member in a first tier of the organization may have one or more second associates signed up "under" the first member in second tier. Similarly, one or more other third tier sales associates may be signed up "under" one or more of the second associates in a third tier, and so on. Organizations such as these are often best displayed in a directory tree/organizational tree-style layout, which can look like a familial genealogy tree. Such directory or organizational tree-style layouts can be efficient since they convey not only the existence of an associate in the organization, but readily convey the level, placement, and/or responsibilities of the associate in the organization relative to other members. Such level and placement can have a direct impact in terms of types of information that flow to that sales associate, as well as who should be responsible for the associate, of whom the associate is responsible, who should receive what percentage of commissions at what level, and so on.

Unfortunately, conveying this type of directory information to others in the organization can be computationally expensive and inefficient, particularly for large organizations with hundreds or more members, particularly members with widely varying responsibilities. For example, larger organizations tend to maintain such directory information through elaborate databases that store and relate a large amount of information for each member. Maintaining all of this information, much less translating all of this information into a visible directory layout with different organizational tree views based on various permission levels can be computationally expensive not only from the server perspective, but also the client perspective.

Such complex directory representations often involve the display of multiple different pages and even multiple different formats. This often tends to result in the member's client computer system processing an organizational tree that is difficult to use. This difficulty stems at least in part since the client system receives too much information to process, or receives too little information at a time. Such problems can result in the member receiving information that is impertinent or untimely or both.

For example, upon request to access an organizational tree, conventional organizational servers send all of the organizational information to the client system's browser. Upon receipt, the client browser might then use one or more client-side programs or interfaces to load and execute the information for each member of the organization into a visible organizational tree. Although the organizational tree used by the client in this example might have a range of information, the client's use of the information might be significantly hindered due to the slow loading and execution speed. For example, the client system may be encumbered due to the difficulty of retrieving directory information through several interfaces.

This slower execution can come from the fact that the organization might present the organizational tree information using a large amount of client-side instructions, such as database retrieval instructions. Thus, organizations will alternatively provide a small amount of information that can be loaded at once. This is typically done using basic markup languages such as HTML, which have limited or no client-side scripting, but which have minimal capabilities. Organizational trees presented using HTML tend to provide only be limited amounts of information.

For at least these reasons, conventional organizational tree presentations tend to be an all-or-nothing situation, and most organizations opt for organizational trees that tend to have few interactivity features. Such features usually allow the user to do little else than simply identify the members and their placement within a particular organization. If the relevant end-user finds an error in a particular placement in a directory tree, the user may need to send a message to the organization asking for a repair. Similarly, this also means that the end-user is often precluded from viewing the organizational tree in different ways, such as various metrics or status information about other members in the organization beyond basic member names, phone numbers, etc.

Accordingly, there are a number of disadvantages and inefficiencies with the providing of organizational information that can be addressed.

BRIEF SUMMARY OF THE INVENTION

Implementations of the present invention overcome one or more problems in the art with systems, methods, and computer program products that provide for rich displays of directory trees in an efficient manner both for delivery and computer client-side processing. In particular, implementations of the present invention allow organizations to provide end users with directory trees that provide as much member information as needed, and the ability to even manipulate or update the directory tree without overburdening computational resources on either the server or client side. In one implementation, such provided interactivity includes providing the ability to filter directory tree views in a highly customized way, the ability to modify desired or required outcomes in directory tree listings through point and click mechanisms, and the ability to broadcast communications to selected nodes or members of the displayed organizational tree through a single interface.

For example, a computer-implemented method from the perspective of a client-side computer system for providing a feature-rich, interactive organizational tree through a user interface can involve sending one or more requests to a server system to view related members of an organization. The method can also involve receiving a set of initial instructions from the server system that enable the client-side system to render an initial view of an organizational tree display corresponding to the related members. The set of initial instructions can include one or more filter controls for filtering a view of the organizational tree corresponding to a subclass comprising one or more of the related members in the display.

In addition, the method can involve receiving a user request through a displayed user interface that changes one or more of the filter controls. The method can further involve rendering a set of subsequent instructions from the server system as a subsequent view of the organizational tree. As such, the client-side system displays a subclass of the related members differently than the rest of the related members in the displayed organizational tree.

By contrast, a computer-implemented method from the perspective of a server for providing a feature-rich interactive organizational tree can involve receiving one or more requests from a client-side system to view related members of an organization. The method can also involve sending a set of initial instructions to the client-side system that enable the client-side system to render an initial view of an organizational tree corresponding to the related members. In this case, the set of initial instructions includes one or more filter controls for filtering a view of the organizational tree corresponding to a subclass of the related members.

In addition, the method from the perspective of a server can involve receiving a request from the client-side system that changes one of the filter controls. The method can further involve sending a set of subsequent instructions to the client-side system that enable the client-side system to render a subsequent view of the organizational tree. As such, a subclass of the related members is displayed differently at the client-side system than the rest of the related members in the organizational tree.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates a flowchart of a method from the client side for providing an interactive organizational tree in accordance with an implementation of the present invention; and FIG. 6 illustrates a flowchart of a method from the server side for providing an interactive organizational tree in accordance with an implementation of the present invention.

DETAILED DESCRIPTION OF THE PREFERRED EMBODIMENTS

Figure 1A:
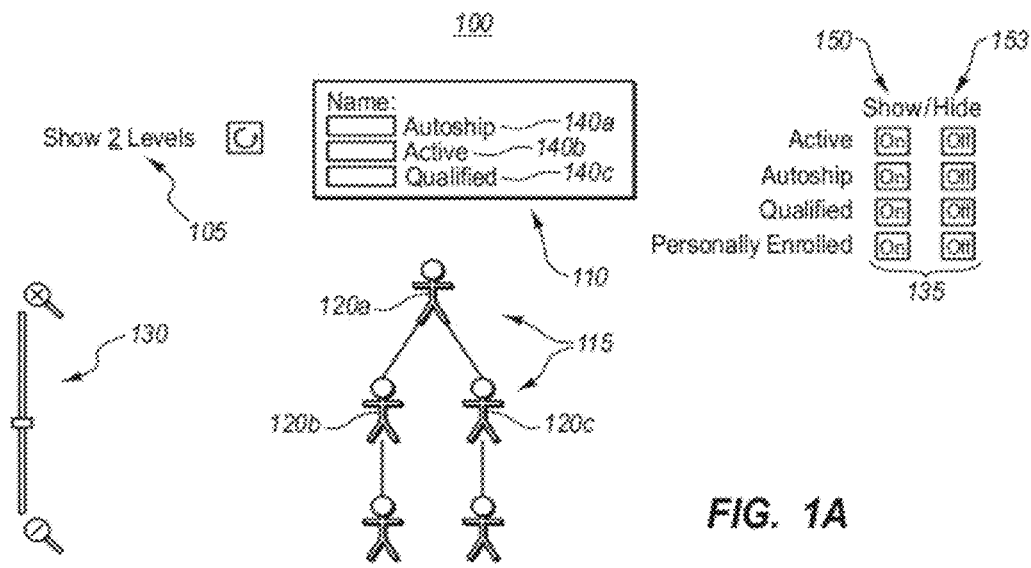
FIG. 1A illustrates an exemplary user interface for accessing and working with an organizational tree configured in accordance with at least one implementation of the present invention.

The present invention extends to systems, methods, and computer program products that provide for rich displays of directory trees in an efficient manner both for delivery and computer client-side processing. In particular, implementations of the present invention allow organizations to provide end users with directory trees that provide as much member information as needed, and the ability to even manipulate or update the directory tree without overburdening computational resources on either the server or client side. In one implementation, such provided interactivity includes providing the ability to filter directory tree views in a highly customized way, the ability to modify desired or required outcomes in directory tree listings through point and click mechanisms, and the ability to broadcast communications to selected nodes or members of the displayed organizational tree through a single interface.

For example, and as understood more fully herein, implementations of the present invention allow a user to login to an organization's website and select a visual display for an organizational tree (e.g., 115, 315, FIGS. 1A through 4). This results in a series of requests between a client (e.g., 300) and server (e.g., 350) to provide only the most minimal amount of information to draw the organizational tree in real-time and provide basic interactive controls. A server then provides initial information to the user's client-side computer system that relates to rendering one or more the initial aspects of the organizational tree.

In order to provide rich interactivity, at least one implementation of the present invention includes providing and rendering the instructions for the organizational tree user interface (e.g., 100) using animation code such as FLASH-type animation coding standards. Of course, one will appreciate that implementations of the present invention are not limited to any particular software or type of programming code/standard. For example, implementations of the present invention can also be accomplished using animations written with coding standards implemented with HTML, DHTML, ASP, MICROSOFT NET, C SHARP, SILVERLIGHT, DHTML, and so forth. In either case, one will appreciate that such animation coding can allow the organization to present a wide range of rich interaction features effectively in real-time without overburdening the client-side with a great deal of client-side scripting instructions.

As the user (e.g., a member of the organization) selects various additional aspects of the organizational tree to display, the server subsequently sends additional rendering information for the new selection(s). As understood more fully herein, this (and other such features) can help minimize the amount of information that the user's client-side computer system will need to download and/or process at any given time. Thus, in some cases, the user can drive the amount of information that the client-side system downloads for operating the organizational tree.

Such minimization of network and processing loads can become particularly important in view of the number of different tasks that a user can perform with the organizational tree of the present invention, as well as in view of the need to provide information (including any customizations) to the user in real-time. In at least one implementation, for example, the organizational tree user interface can comprise one or more option controls (e.g., 105, 135) for configuring the look or feel of the organizational tree, as well as the amount of information the member would like to view about any particular other member of the tree. For example the user/member (e.g., organizational administrator, or distributor in some cases) can manipulate the various options controls to retrieve detailed information about select members, and/or to manipulate the organizational tree by moving selected members from one area of the organizational tree to another (or even deleting such members where appropriately authorized), thus changing in real-time the information displayed. The user can also use the various option controls to expand the size or dimensions of the organizational tree, or even hide or show various organizational tree members that correlate with certain criteria.

One will appreciate that the code in accordance with implementations of the present invention can also be used to limit use of these and other features (e.g., moving or deleting members) in the organization. In one implementation, for example, the server-side can be configured to coordinate code delivered to an end-user in accordance with various permissions associated with the end-user. Thus, if the end-user is a corporate administrator, the server-side might provide enhanced features in the organizational tree that might not be available to another user who is merely accessing the organizational tree as a lower level sales agent. An organization thus has a wide range of options using principles of the present invention to customize how and to whom information is delivered, and how changes can be made. Specifically, the organization has a wide range of latitude in how it allows various associates, members, representatives, or employees, etc. to customize certain features and controls described herein for user interface 100.

Along these lines, and as also understood more fully herein, some of the other features that can be provided further include use of such option controls and/or menu items (e.g., 200, 210, 220). In one implementation, these option controls and/or menu items can be used to send messages to other members in the given organizational tree, and further limit and distribute these messages in accordance with user-defined triggers/events. For example, the user can use the various option controls to select various menu items that filter or display only certain organizational tree members, and/or send corresponding filtered or client enabled messages thereto.

The sent messages can include, but are not limited to, pre-recorded text, voice, and/or video messages. As understood more fully herein, these messages can further include options for creating such messages just before sending, or setting up telephone calls, teleconferences, or even the sending or setting up of the same based on particular events (or triggers). For example, the user interface described herein can provide options to the user for sending certain types of messages to a subclass of members only on certain dates, certain types of day, or in response to certain other events (e.g., meeting reminders, birthdays, etc.)

Of course, one will appreciate that other triggers that can be used include those related to changes in member status, sales numbers, recruiting activities, etc. Furthermore, these and other similar triggers can be modified based on geographic location of the users and/or sub-organizations so that the calls or delivery of messages is scheduled in a coordinated manner. These and other similar triggers can also be modified by the organization itself so that the user's selections for triggers and messages are governed, enabled, or even prohibited in accordance with certain company rules and/or user permissions.

FIG. 1A illustrates an overview schematic diagram of a user interface 100 that can be used to display an organizational tree 115 in accordance with an implementation of the present invention. For example, FIG. 1A shows that a user (e.g., a member of a particular organization) uses a computerized client-side system to login to a website for the organization, and has downloaded instructions that, when executed at the client-side system, result in the display of a corresponding organizational tree. The illustrated user interface 100, in turn, represents an exemplary rendering thereof. By way of explanation, one will appreciate that the illustrated user interface 100 can be displayed on any computerized display device, including but not limited to a display monitor of a personal computer, or a display monitor on a personal device assistant (PDA) and/or cellular phone, etc.

FIG. 1A illustrates also that the exemplary user interface 100 can comprise a number of different features, menus, status indicators, and option controls that readily display information with respect to work relationships with coworkers (or other "members") in the organization. For example, FIG. 1A illustrates that organizational tree 115 can comprise various members 120, such as members 120a, 120b, and 120c, etc. In the illustrated example, member 120a represents the user who logged in to the organization's website and requested a view of an organizational tree (e.g., via a separate user interface, not shown). By contrast, members 120b and 120c represent those who are under the purview of member 120a. The illustrated members beneath members 120b and 120c similarly represent those members who are under the purview thereof. For example, member 120a is a distributor in a sales organization, while members 120b and 120c are those "signed up under" distributor member 120a, and so forth.

In addition, FIG. 1A illustrates that user interface 100 displays organizational tree 115 as a "binary tree." In the illustrated case, only two branches (e.g., members 120b and 120c with respect to member 120a) are ever shown for any particular member, even though there may be many more than two members under the purview of a particular upper level member 120. One will appreciate, however, that the user may be able to control the organizational tree display so that the tree is displayed as a uni-level tree, or a forced matrix, etc. or some other presentation format. Thus, displaying any particular type of format, or any type of organizational tree can be done out of an effort to simplify the amount of rendering instructions delivered to the user's client-side computer system. Such considerations can also include simply providing the logging-in user a brief overview of the organizational setup in a relatively limited context. In additional or alternative implementations, however, the user interface 100 can provide the user with a wide range of options that allow the user to view a much wider context, including all possible branches, layouts, and/or formats of a given organizational tree 115.

Along these lines, FIG. 1A shows that user interface 100 can comprise a magnification slider 130 that allows the user to expand and minimize views (or even number of displayed member branches) of each individual user to find additional details. In at least one implementation, for example, the user can move slider 130 upward or downward. Such upward or downward movement can change the number of branches displayed for a user, the size of the overall organizational tree 115, and/or to see or hide various details of each particular member in the initial view.

Thus, if the user were to move the slider bar 130 more toward the upper end (e.g., to the "+" end), the user interface 100 can expand the size of organizational tree 115 displayed so that each member 120 becomes visibly larger on the given display, and, in some cases, each member 120 displays more information (e.g., name, position, etc.) (Of course, one will appreciate that the user interface 100 can also include other options that a user can manipulate to change the view of the directory tree in meaningful ways, such as, but not limited to rearranging the tree nodes based on member rank, using color codes for other differentiation, rotating the directory trees, etc.)

Figure 1B:
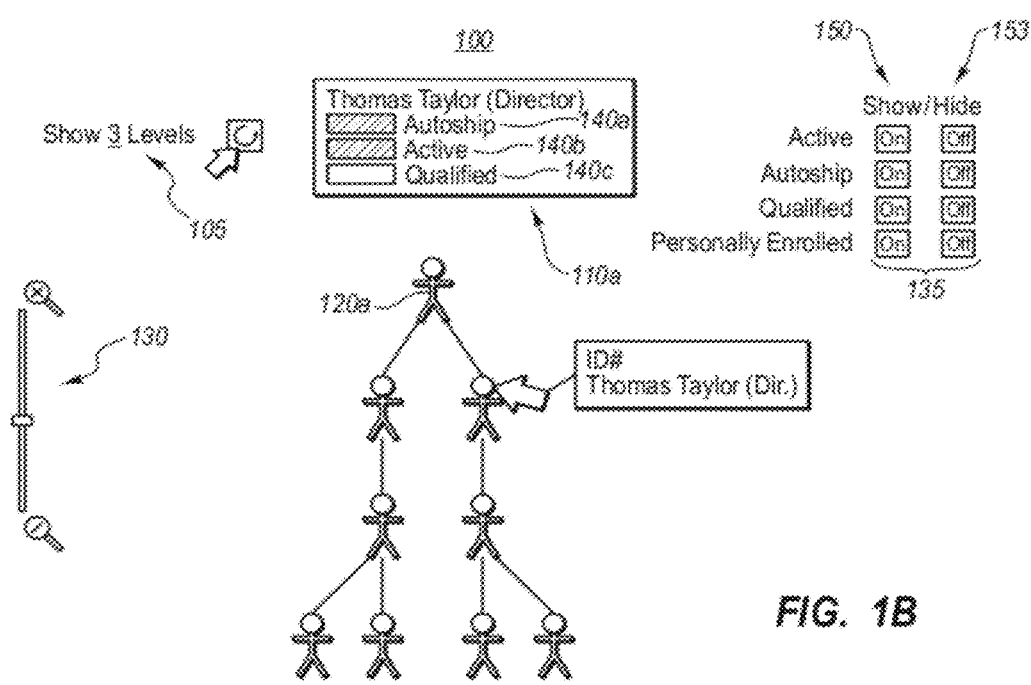
FIG. 1B illustrates the user interface shown in FIG. 1A after a user has updated the number of tree levels using one or more controls in accordance with an implementation of the present invention.

Along similar lines, FIG. 1A shows that the user interface 100 can comprise at least one option control in the form of a level selector 105, which allows the user to change the number of people shown upward or downward of the initial, logged-in member 120a in organizational tree 115. As shown in FIG. 1B, for example, the user can change the number of levels in level selector 105 to "3" (rather than the previous "2", FIG. 1A). In at least one implementation, the user's selection of an execution button in this option control causes the organizational tree 115 to automatically display 3 levels of members 120. Of course, simply adding levels below the main, logged-in member 120a is not required, and the level selector 105 can be further configured to add levels above the main directory member 120a, or above and/or below member 120a, as desired and/or configured by the organization.

In addition to the foregoing, FIG. 1B illustrates that user interface 100 can further comprise a number of different other selection or identification options. Such options can be used to immediately identify important details for each member 120 of organizational tree 115, without necessarily having to magnify the tree (e.g., with control 130). This information can be provided differentially based on both mouse "hover" and mouse depression techniques.

For example, FIG. 1B shows that, in at least one implementation, hovering the cursor over a given directory member (e.g., without depressing a mouse button) can cause the user interface 100 to automatically display the member's user name, organizational identifier, and/or other relevant "at-a-glance" information. By contrast, executing a selection of the directory member 120 in this case (e.g., by depressing a mouse button) can cause the user interface 100 to populate information bar 110a. In the present example, information bar 110a contains additional details beyond those presented in the "hover" selection, which may be particularly relevant to the organization, job descriptions, etc. One will appreciate, of course, that the information displayed in this case is widely configurable, and can include any information that the organization determines that a user should be able to retrieve "at a glance." For example, such information can include, but is not limited to name, address, phone numbers, email addresses, birth date, order or sales commissions, etc.

In this case, the illustrated user interface 100 is particularly configured for displaying sales organization data, such as might be used with direct or commission-based sales organizations. For example, information bar 110a is configured to display information, such as whether a member is registered for "Autoship," meaning that the member has a certain amount of product shipped directly to them each month. Information bar 110a is further configured in this case to provide "Active" information, which is whether the member is continually engaged in sales activities. Furthermore, FIG. 1B shows that information bar 110a can comprise information regarding whether the member is "Qualified" for a particular sales level.

In each case, user interface 110 can display these indicia with a number of different indicators. Nevertheless, in the present example, the illustrated indicators are shown with binary status indicators 140a, 140b, and 140c. In this case, therefore, since status indicators 140a and 140b are shaded (while status indicator 140c is not shaded), information bar 110a indicates that member "Thomas Taylor" is a "Director," who is "Active" in his sales position, is registered for "Autoship," but is not "Qualified" for a particular level.

FIGS. 1A and 1B further show that user interface 100 can comprise a set of one or more option controls in the form of configurable filters 135 (or "filter controls"), as discussed more fully herein. These filters 135 can be provided as organizational defaults in some cases, and can also be provided as user-configured filters. In either case, the filters allow the user to immediately change the view of organizational tree 115 (into various subclasses of members), and thus easily convey still further information about organizational members through user interface 100. For example, FIGS. 1A-1B show that filters 135 comprise a selection for "Active," "Autoship," "Qualified," and "Personally Enrolled," such as similarly discussed with respect to information bar 110a. These filters 135 can further comprise various binary indicators, and a set of one or more "On" buttons 150 or "Off" buttons 153 with each selection criteria, which can be used to "Show" or "Hide" the relevant feature. One will appreciate that these show/hide buttons 150/153 can take a wide range of visual forms beyond simply "On" or "Off" buttons as shown.

Figure 1C:
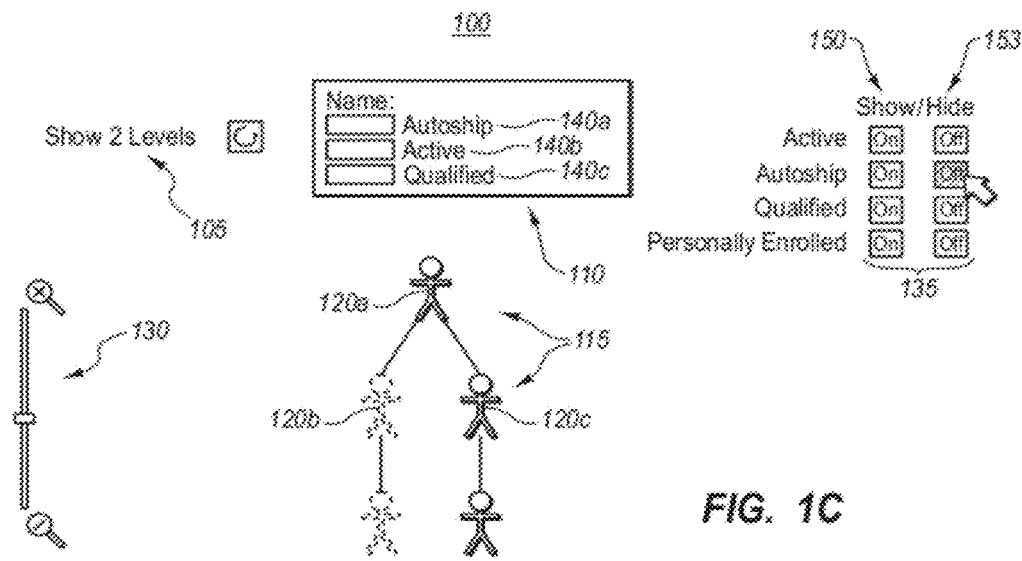
FIG. 1C illustrates the user interface of FIG. 1A after the user has selected a filter in accordance with an implementation of the present invention.

For example, FIG. 1C shows that selecting or deselecting the "Off" 153 beside "Autoship" will either "Show" or "Hide" in organizational tree 115 the subclass of members 120 who have not been registered for Autoship. By contrast, selecting or deselecting the "On" button beside "Autoship" will either "Show" or "Hide" in organizational tree 115 the subclass of members 120 who are registered for Autoship. In the present example of FIG. 1C, the user has selected the "Off" button for Autoship; and as such, user interface 100 has hidden the current subclass members (e.g., 120b and below) in organizational tree 115 who are not registered for Autoship.

One will appreciate that the filter controls 135 can be used not only to easily identify various criteria about organizational tree members 120, but also to perform functions with respect to the selected/filtered class of members 120. In particular, at least one implementation of the present invention includes a plurality of different manually and/or automatically implemented communication functions that can be coordinated with one or more members of the organization, including various classes of subclasses of such members. For example, a user can filter a particular view of the organizational tree 115, such that the user interface 100 shows a particular subclass of members in organizational tree 115, and then set up the sending of messages only to those members of the selected class (e.g., via a drop-down menu).

Figure 2:
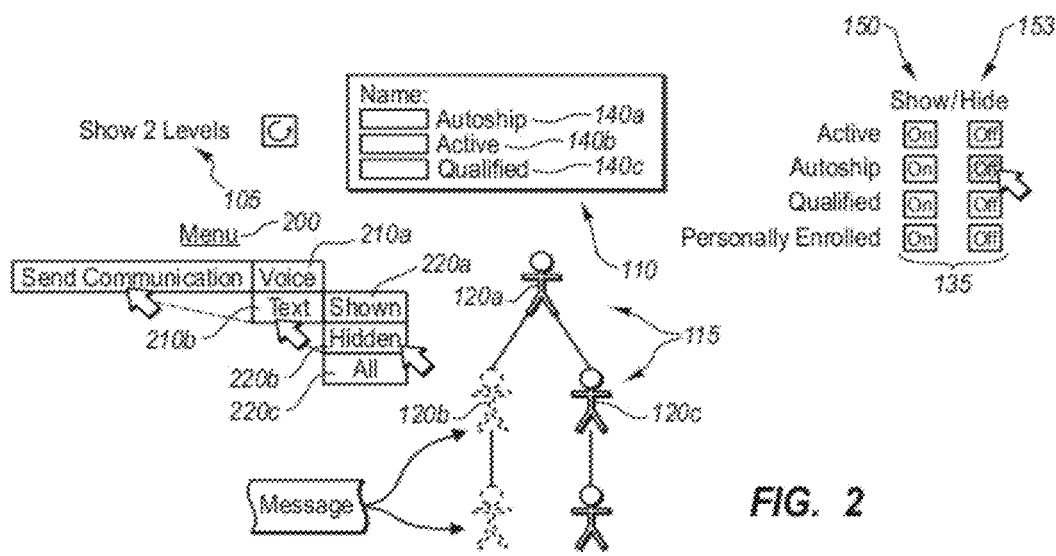
FIG. 2 illustrates one or more interfaces that can be used to send messages to the filtered subclass of organizational tree members shown in FIG. 1C.

Along these lines, FIG. 2 shows that user interface 100 can further comprise at least one set of additional menu options 200 with various selectable submenus. For example, FIG. 2 shows that menu 200 for sending communications can further comprise a set of submenu items 210a, 210b for sending voice or text, respectively. In the present example, the user has selected the sending of "text" based messages through submenu item 210b, which results in still further submenu items 220a, 220b, and 220c. Submenu items 220a, 220b, and 220c in this case further relate to the subclass of members 120 selected according to the current filter controls in organizational tree 115; specifically, those that are "Shown," "Hidden," (or "Highlighted"), or "All" members. In this case, the user has thus selected the sending of text messages to those members 120 of organizational tree 115 that are currently hidden (i.e., those members who are not registered for Autoship).

As such, the user may select the sending of text messages to each highlighted member reminding them to register for Autoship. The sending of such messages may be instantaneous, or can also be set up based on an automatic trigger or event. For example, the user may be presented with one or more additional options (not shown) that allow the user to send pre-recorded voice or text messages to all of the hidden users (in this example) on a particular date, or day of the month, etc. The user can alternatively send other types of video, text, or voice messages to all members in the organization, or to selected subclasses of members based on recurring events. One will appreciate that such communications can comprise reminders (including voice, text, or video formats) for a calendar meeting on the third Thursday of every month, or various messages to select members with specific birthdays, etc.

Along these lines, the set of menu items 200 can further include one or more sub-menus (not shown) that provide a telephone number that the user can call to store a voice message at a particular media storage location. (By way of explanation, one will appreciate that the indicated storage location can be managed by the organization itself, or can be an electronic storage maintained by another third party entity.) One will appreciate that, in addition to what is explicitly shown or described, the sub-menu items may additionally or alternatively comprise one or more other more general action buttons (or triggers), which allow a user to simply click and begin recording a voice message (e.g., rather than a phone number). The menu items may further include one more additional items that allow the user to store the voice message for some predetermined time, or for one or more predetermined events, so that the system sends the prerecorded message as directed by the user when the time or event occurs.

The user interface 100 can also be configured to provide one or more options to retrieve the message (or any other pre-recorded or previously generated voice or text messages) from the media storage location and send it to particularly filtered members 120. In addition, one will appreciate that other filters can be implemented in accordance with the present invention that further filter the user's communication requests. For example, the user's client computer system (e.g., 300, FIG. 3A), and/or the web browser (e.g., 310, FIG. 3A) can be configured to add various delivery rules to the end user's message selection requests that block, redirect, or otherwise condition the user's outgoing messages (or even retrieval of pre-recorded messages) in accordance with some organizational policy.

In one implementation, the organization could place a rule in the system that would block a user's message from going to anyone in the user's selected filtered group (i.e., subclass) if those individuals where in the "down line" (i.e., below) of an individual in the displayed organizational tree who has the same rank (or higher) as the end user making the message selection request. In such a case, the end-user's message could be configured to stop at that particular individual member. That particular individual member could then have the option to automatically forward the message on (following the same filtered rules), or to physically view the message and then to manually forward it on. The selected message could then continue to trickle down the line of the organizational tree, until encountering the same situation, wherein the next individual member would then have the option to automatically or manually forward the message onward, and so forth.

However configured, one will appreciate that the ability to filter out members 120 of an illustrated organizational tree 115 and send messages (e.g., either manually or on a scheduled basis) to the selected subclass of members can provide the end-user and the organization with a wide range of options for selectively communicating with and/or otherwise managing members of the organization. Such options can ensure that users and/or organizations can specifically target the sending of messages to organizational members, and ensure that such messages are sent in a highly resolved, focused, and customizable way.

Figure 3A:
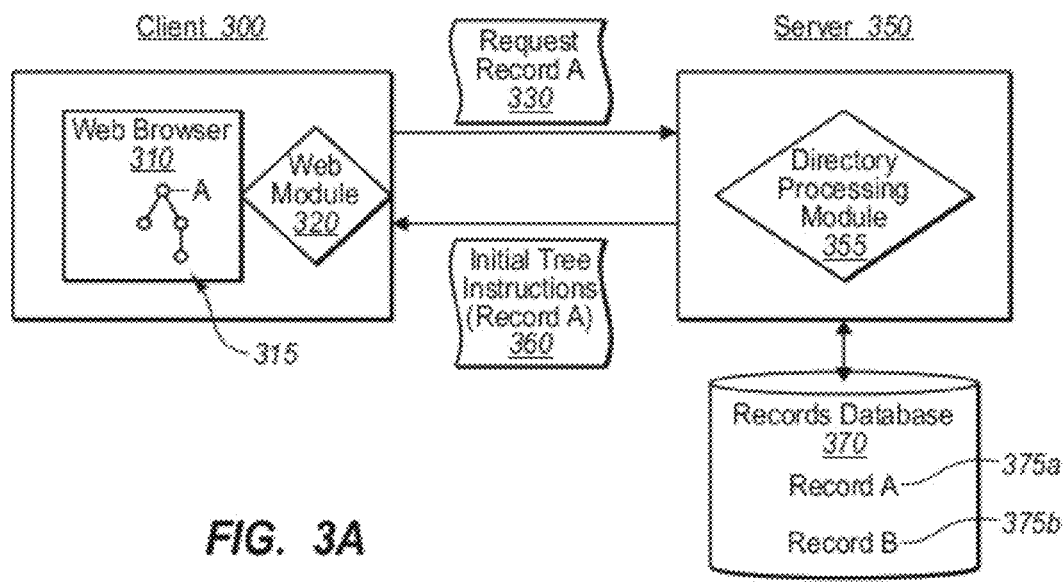
FIG. 3A illustrates a schematic diagram of client and server interactions for displaying an organizational tree in accordance with an implementation of the present invention.
Figure 3B:
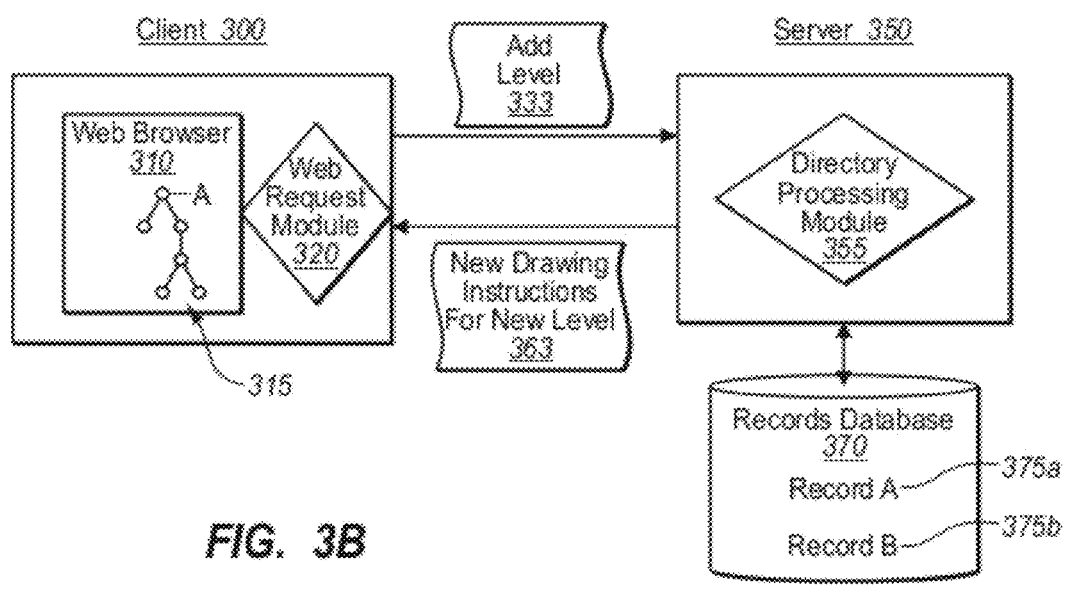
FIG. 3B illustrates the schematic diagram of FIG. 3A in which the organizational tree is modified or redrawn upon additional user selections.
Figure 4:
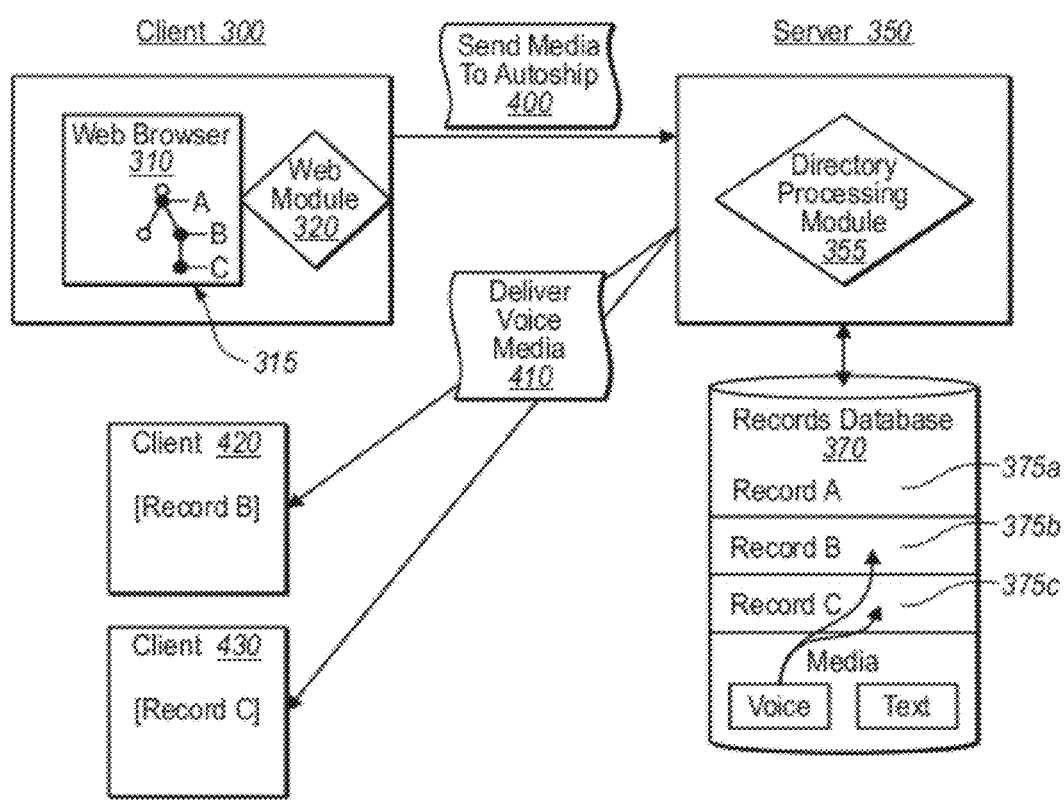
FIG. 4 illustrates a schematic diagram in which client's interactions with the organizational tree result in recorded messages being sent to selected members of the organizational tree in accordance with an implementation of the present invention.

FIGS. 3A through 4 illustrate various schematic diagrams comprising components and modules that can be used to enable the features and mechanisms described or shown with respect to FIGS. 1A through 2. For example, FIG. 3A illustrates a schematic diagram of some of the components and modules for logging into, accessing, and/or otherwise rendering a display of the organizational tree (e.g., 115, 315) in various stages with minimal network and processing loads. In particular, FIG. 3A shows that the end user may use a client-side system 300, which in turn uses a web browser 310 to render and display an organizational tree 315 (also 115, FIGS. 1A through 2). FIG. 3A further shows that the web browser 310 can be configured to use one or more web modules 320 to communicate information to and from server 350, and/or to render received information for display.

For example, when a user initially requests access to the organizational tree 315 (or 115, FIGS. 1A through 2), the initial access request can result in a request 330 for one or more initial records for a particular member of the organizational tree 315. Accordingly, FIG. 3A shows that client 300 web browser 310 uses web module 320 to send one or more requests 330 to server 350 for the minimal set of record information needed to draw the initially requested organizational tree. FIG. 3A also shows that server 350, in turn, can process request 330 through its own set of one or more directory processing modules 355.

For example, FIG. 3A illustrates an implementation in which directory processing module 355 communicates with a records database 370. Records database 370, in turn, may be part of server 350, or may comprise one or more separate storage media managed by still further separate database servers (not shown), such as a data farm. However configured, the records database(s) 370 comprises the relevant details for each member 120 in the organization, as well as the various relationships between members. For example, FIG. 3A shows that records database 370 comprises at least records 375a and 375b for members "A" and "B." Thus, in response to the request 330 for "Record A," FIG. 3A shows that server 350 uses directory processing module 355 to return corresponding instructions 360 for rendering "Record A" in organizational tree 315. Instructions 360 can further comprise information for drawing placement of record A in a display with respect to other members using an organizational tree-style format.

In at least one implementation of the present invention, and as previously discussed herein, the present system can minimize the amount of network and processing loads for drawing the organizational tree at any given time. Generally, this means sending over that minimal bit of animation instruction (e.g., using appropriate animation instructions, or the like) needed to draw only that portion of the organizational tree 315 that is currently in view and/or requested by the user. In some cases, this information can include visual object information regarding the look and feel of each tree member, as well as certain other minimal information about each rendered member 120, such as may be used to illustrate information requested during a "hover" event (e.g., FIG. 1B).

In the present example, the system can similarly be configured to minimize network loads by only sending rendering information associated with the number of selected levels in the organizational tree (e.g., using level selector 105). As shown in FIG. 3A, for example, the user has only selected organizational tree 315 for two levels of members. In FIG. 3B, however (e.g., as in FIG. 1B), the user has selected to change the level so that the organizational tree is now three levels deep. In the illustrated implementation, therefore, client 300 sends a new request 333 to server 350 to obtain record information that may be needed to add another level in organizational tree 315.

FIG. 3B further shows that server 350 then processes this request 333 via directory processing module 355, which, in turn pulls additional information about these levels and corresponding record(s) from records database 370. Server 350 then sends processes the information from records database 370, and uses directory processing module 355 to send a set of new instructions 363 to client 300. As with instructions 360, these new instructions 363 can contain information that positions and/or draws Record B 375b with respect to Record A 375a in the visual format of organizational tree 315. FIG. 3B shows that client 300 then uses web browser 310 to render the new instructions 363 as appropriate for display.

FIG. 4 illustrates a generalized schematic of the components and modules in FIGS. 3A-3B when a user sends communications to a filtered portion of organizational tree 315. For example, FIG. 4 shows that client 300 is configured to display organizational tree 315 in a manner that only some of the members (e.g., a subclass thereof) are highlighted (or hidden, etc.) In particular, FIG. 4 shows that the user has determined to send media to a particular filtration associated with an "Autoship" feature. For example, the user has selected the various menu items 200 and submenu items (e.g., 210a, 220a) to send audio media to those who are currently "Shown" in the display of organizational tree 315.

FIG. 4 shows that, in this case, the user request results in the preparation by client 300 of a request 400 from web module 320 to server 350. Server 350 then processes the request 400 via records database 370 (or appropriate data farm). In at least one implementation, this processing involves server 350 (e.g., via module 355) instructing records database 370 to associate a particular voice message in a media storage location (local or remote) with selected records 375a, 375b, and/ or 375c. (In the event the user of client 300 pertains to Record A 375a, the voice message can be set up to be sent only to members associated with Record B 375b and Record C 375c.)

In addition, FIG. 4 shows that server 350 further prepares and sends (or instructs a separate media server to send) the requested media as appropriate to the relevant members. For example, records B 375b and C 375c may include various contact format information such as email addresses, telephone numbers, or other voice messaging systems, which provide a location for the receipt of voice messages from server 350. In one implementation, server 350 (whether by itself, or via another server) determines what is the registered contact mode that allows the selected member in the class to receive voice messages.

In some cases, the appropriate contact method may be set up by the members themselves. As previously discussed herein, the members can set up contact information in a profile so that email contact information is for use only between 9 am and 5 pm on regular business days, and a cell phone can be used for contact on weekends. Similarly, the message itself can be configured for a particular format (e.g., email or voice), which is further tied to certain times of the day. For example, the recipient can receive emails at one address at one time of day, emails at another address at another time of day, and voice messages within yet another specified time interval. Furthermore, and as also previously mentioned above, one will appreciate that such messages can be further filtered so that one type of subclass of members receives one type of message (e.g., email, voice, etc.) at certain times of a day or month, while other subclasses of members receive the messages at other times of the day or month. As such, one will appreciate that the type of messages that can be delivered, as well as where, when, and to whom such messages are delivered, can be heavily customized in accordance with implementations of the present invention.

FIG. 4 further shows that, upon determining an appropriate contact format method, server 350 then sends the media via one or more messages 410 to the clients 420, 430 associated with the given records "B" and "C." For example, server 350 may send message 410 to a media delivery server, which, in turn, may send voice messages through an email delivery mechanism, or directly to a phone system over a phone network. However sent, server 350 can ultimately receive confirmation of message delivery and register this in records database 370. This allows server 350 to further report back to the client 300 with appropriate rendering instructions (not shown) regarding safe delivery (or lack thereof) of the requested message.

Accordingly, FIGS. 1A through 4 and the corresponding text illustrate or describe a number of different components, mechanisms, and interfaces that can be used to efficiently access and interact with organizational information. As understood herein, these components, systems, and mechanisms can provide a wide range of advantages to users, which enable users to easily understand organizational structures, and further to manage members of the organization using efficient electronic means. Such efficiency can be possible in spite of highly complex member relationships in an organization, which are often updated and stale from one month to the next.

In addition to the foregoing, implementations of the present invention can also be described in terms of flowcharts comprising one or more acts in a method for accomplishing a particular result. For example, FIGS. 5 and 6 illustrate flowcharts from the perspective of client-side system 300 and server system 350, respectively, for providing a feature-rich, interactive organizational tree in an efficient manner. The acts and steps of FIGS. 5 and 6 are discussed below with reference to FIGS. 1A through 4.

For example, FIG. 5 shows that a method from the perspective of client 300 can comprise an act 500 of sending a request to view related organizational members. Act 500 can include sending one or more requests to a server system to view related members of an organization. For example, a user logs into an organizational website (e.g., via web browser 310) and requests a view of an organizational tree of members that are related to the user in the organization.

FIG. 5 also shows that the method from the perspective of client 300 can comprise an act 510 of receiving instructions that enable rendering of an organizational tree. Act 510 can include receiving a set of initial instructions from the server system that enable the client-side system to render an initial view of an organizational tree display corresponding to the related members, wherein the set of initial instructions includes one or more filter controls for filtering a view of the organizational tree corresponding to a subclass comprising one or more of the related members in the display. For example, upon user request, client 300 sends request 330 for one or more records related to the user pursuant to creating rendering organizational tree 315.

In addition, FIG. 5 shows that the method from the perspective of client 300 can comprise an act 520 of receiving a user filtration request of the organizational tree. Act 520 can include receiving a user request through a displayed user interface that changes one of the filter controls. For example, as shown in FIG. 1B or 1C, the user changes the number of viewed levels, or alternatively selects a subclass of members to hide from view using controls 105 or 135. This change in view or other filter, in turn, results in the sending of new instructions (e.g., 333) to the server 350, such as shown in FIG. 3B.

Furthermore, FIG. 5 shows that the method from the perspective of client 300 can comprise an act 530 of rendering subsequent instructions that change a view of a portion of the organizational tree. Act 530 can include rendering a set of subsequent instructions from the server system as a subsequent view of the organizational tree, wherein the client-side system displays a subclass of the related members differently than the rest of the related members in the displayed organizational tree. For example, FIG. 1B shows that a few of the members 120 are modified to show additional levels above or below them in the organizational tree, while FIG. 1C shows that some of the members (e.g., 120b) in the organizational tree are hidden from view.

In addition to the foregoing, FIG. 6 shows that the method from the perspective of server 350 for efficiently providing use of a feature-rich organizational tree can comprise at least an initial act 600 of receiving a client request to view related organizational members. Act 600 includes receiving one or more requests from a client-side system to view related members of an organization. For example, when a user logs-in through client-side system 300, the server receives one or more sets of initial requests (e.g., 330) for instructions that enable rendering of a corresponding organizational tree 115.

FIG. 6 also shows that the method from the perspective of server 350 can comprise an act 610 of sending initial instructions to enable rendering of an organizational tree. Act 610 includes sending a set of initial instructions to the client-side system that enable the client-side system to render an initial view of an organizational tree corresponding to the related members, wherein the set of initial instructions includes one or more filter controls for filtering a view of the organizational tree corresponding to a subclass of the related members. For example, FIG. 3A shows that server 350 can respond to request 330 with one or more instructions 360 (e.g., after retrieving the information from database 370) for rendering an initial tree display.

In addition, FIG. 6 shows that the method from the perspective of server 350 can comprise an act 620 of receiving a client request related to filtering the organizational tree. Act 620 includes receiving a request from the client-side system that changes one of the filter controls. For example, as shown in FIG. 3B, server 350 receives one or more sets of additional instructions related to a change in the level selector 105, or a change to one of the filters 135 (e.g., to add a level—FIG. 1B, or to hide those not registered for Autoship—FIG. 1C).

Furthermore, FIG. 6 shows that the method from the perspective of server 350 can comprise an act 630 of sending subsequent instructions that enable a new or updated rendering of a portion of the organizational tree. Act 630 includes sending a set of subsequent instructions to the client-side system that enable the client-side system to render a subsequent view of the organizational tree, wherein a subclass of the related members is displayed differently at the client-side system than the rest of the related members in the organizational tree. For example, FIG. 3B shows that server 350 responds to the subsequent request 333 with one or more sets of additional instructions 363, which results in corresponding changes to the display of organizational tree 315 (or 115, FIGS. 1B, 1C). As shown in FIG. 1B or 1C, this can mean adding/deleting the number of levels shown, hiding or revealing members of a particular subclass, and so forth.

Accordingly, implementations of the present invention provide a number of components and mechanisms for efficiently providing a feature-rich, interactive organizational tree. In particular, implementations of the present invention can be used to provide a useful organizational tree with a number of different options that not only inform a user how others in an organization are related, but also inform the user how others in the organization are performing, and other status identifiers. Implementations of the present invention can also be used to provide a user with rich communication options that allow the user to broadcast a wide range of messages in a wide range of formats to an organization generally, as well as to specific, particularly defined members of the organization.

In addition to these features, one will appreciate that implementations of the present invention can also include other features not explicitly recited herein using the animation (e.g., FLASH) software, and interactive download/processing features. For example, the animation software instructions of the present invention can be configured to allow a one (e.g., the company running the software, or an appropriately authorized end-user) to move members from one organizational tree branch to another, to delete or add members of an organization with respect to an organizational tree branch, and even to show or hide only those members pertaining to a "right side" or "left side" branch of the organizational tree. In each case, the instructions executed by a user at the client 300 system can be continually communicated on an as-needed basis to the server 350 and vice versa. This ensures that user actions are continually reflected in the records database 370, and that changes in the records database 370 are continually reflected in the client 300 web browser 310.

Accordingly, the embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. For example, although implementations of the present invention are described herein primarily with respect to directory "trees," as such, one will appreciate that the general concepts of the present invention of organizational filtering in a display, and communication through the filtered display can also be applied to a wide range of other presentation formats. In addition, one will appreciate that implementations of the present invention can be practiced in real-time and thus incorporate a number of real-time presentation features. Such real-time processing can be done in accordance with any of the implementations discussed herein.

For example, web module 320 can be configured to continually request and receive updates to the information that the user has specifically displayed and filtered in the web browser 310. (One will appreciate that other information that is not currently displayed will necessarily be current as of the first time the user requests it, and will also be continually updated in the same manner as described herein.) Such requests and updates can further include information such as presence information about whether a user is at a particular computer terminal, which web module 320 can further use to additionally highlight the variously displayed icons for each member 120.

In one implementation, for example, members 120 that are determined to be online at a computer terminal (or otherwise in the office), may be highlighted in some way such as with a bolded outline or change in color shade. Similarly, if one of the members 120 changes its status in some way (e.g., registers for "Autoship"), the web module 320 can also automatically send new information (e.g., received from server 350) that automatically changes the display in browser 310 to show the change in status, and without requiring the user to necessarily refresh the display. One will appreciate, therefore, that the views and displays provided herein can be configured to be continually and automatically up-to-date without requiring further input from the end-user viewing the display of the organizational tree.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At a client system in a computerized environment comprising the client and one or more servers, a computer-implemented method of providing a highly functional, interactive organizational tree for use by an end-user, comprising:
    sending one or more requests to a server system to view related members of an organization, wherein each related member has a direct relationship with at least one other related member in the organization, and wherein each related member also includes one or more properties which are independent of the direct relationship;
    receiving a set of initial instructions from the server system that enable the client system to render an initial view of an organizational tree corresponding to the related members, wherein the set of initial instructions includes one or more filter controls for filtering the initial view of the organizational tree, wherein each filter control specifies criteria for identifying related members having one or more properties that match the criteria;
    rendering the initial view of the organizational tree from the set of initial instructions;
    receiving a user request through a displayed user interface that changes one of the filter controls thereby requesting to view a subclass of the related members in the organizational tree comprising each related member having the one or more properties that match the criteria specified by the changed filter;
    in response to the change in the filter control, sending one or more requests to the server system to view a filtered view of the organizational tree;
    receiving a set of subsequent instructions from the server system that enable the client system to render the filtered view of the organizational tree; and
    rendering the filtered view of the organizational tree from the subsequent instructions, wherein the filtered view displays the subclass of the related members differently than the rest of the related members in the displayed organizational tree.

2. The method as recited in claim 1, wherein:
    the subclass of one or more of the related members defines a work-related characteristic that differentiates the one or more members in the subclass with other one or more members of the organization that do not have the work-related characteristic; and
    the subsequent instructions cause the client system to differentially display the one or more members that belong to the displayed subclass in the organizational tree.

3. The method as recited in claim 2, further comprising receiving a next user request that changes one of the filter controls.

4. The method as recited in claim 3, wherein the next request causes the client computer system to automatically display the one or more members in the displayed subclass in the same manner as the one or more members that are not in the displayed subclass.

5. The method as recited in claim 2, further comprising:
receiving a user request to send communication to the members of the displayed subclass.

6. The method as recited in claim 5, wherein:
the user communication request is received in response to displaying a communication menu item in the display; and
the communication menu item provides one or more triggers that enable the user to record a communication to be sent to the identified members of the subclass;
wherein the communication comprises one or more of a voice, video, or text message.

7. The method as recited in claim 1, further comprising:
receiving a user request to change the number of levels displayed in the organizational tree; and
sending one or more corresponding requests to the server for the subsequent instructions that enable the subsequent view of the organizational tree to be rendered.

8. The method as recited in claim 7, wherein the subsequent instructions cause the client computer system to render additional branches in the displayed organizational tree.

9. The method as recited in claim 1, wherein the one or more properties that match the criteria of the changed filter comprise one or more properties defining an attribute of the related member's sales activities.

10. The method as recited in claim 9, wherein the attribute comprises one of active, autoship, qualified, or personally enrolled.

11. The method as recited in claim 1, wherein displaying the subclass of the related members differently than the rest of the related members in the displayed organizational tree comprises either highlighting the subclass, or hiding the related members that are not included in the subclass.

12. The method as recited in claim 1, further comprising:
while the filtered view is being displayed, automatically receiving new instructions from the server system that cause a first related member which was not previously in the subclass to be displayed in the same manner as the related members in the subclass, wherein the new instructions are sent in response to the first member's one or more properties being modified on the server system to match the criteria of the changed filter.

13. At a server system in a computerized environment comprising the server and one or more user interfaces at a client computer system, a computer-implemented method of providing a highly functional, interactive organizational tree for use by an end-user, comprising the acts of:
receiving one or more requests from a client system to view related members of an organization, wherein each related member has a direct relationship with at least one other related member in the organization, and wherein each related member also includes one or more properties which are independent of the direct relationship;
sending a set of initial instructions to the client system that enable the client system to render an initial view of an organizational tree corresponding to the related members, wherein the set of initial instructions includes one or more filter controls for filtering the initial view of the organizational tree, wherein each filter control specifies criteria for identifying related members having one or more properties that match the criteria;
receiving a request from the client system that indicates that one of the filter controls has been selected thereby requesting to view a subclass of the related members in the organizational tree comprising each related member having the one or more properties that match the criteria specified by the selected filter; and
sending a set of subsequent instructions to the client system that enable the client system to render a subsequent view of the organizational tree that displays the subclass of the related members differently at the client system than the rest of the related members in the organizational tree.

14. A computer-program product comprising one or more non-transitory computer readable media having computer-executable instructions stored thereon that, when executed, cause a computer system to perform the method as recited in claim 13.

15. The method as recited in claim 13, further comprising:
receiving a request from the client system that requests instructions for adding one or more additional levels of related members to the displayed organizational tree; and
sending a set of instructions to the client system which when rendered add the one or more additional levels.

16. The method as recited in claim 13,
wherein the one or more requests comprise one or more event triggers, the method further comprising storing the one or more event triggers with records corresponding to the identified members in the displayed subclass.

17. The method as recited in claim 13, wherein the client request includes hiding one or more members that belong to the subclass, the method further comprising reviewing records of the organization to identify members of the subclass, wherein the subsequent instructions hide one or more members in the displayed organizational tree.

18. The method as recited in claim 17, wherein the client request arises from a user defined filter control in the user interface at the client system.

19. The method as recited in claim 13, further comprising after the set of subsequent instructions are sent to the client system, receiving one or more requests from the client system to send one or more communications to each of the identified members in the displayed subclass, but not to any members that are not included in the subclass.

20. The method as recited in claim 19, further comprising:
identifying a communication option for each identified member of the displayed subclass; and
sending the communication to each identified member in accordance with the corresponding identified communication option.

21. The method as recited in claim 20, further comprising:
retrieving the requested communication from a data store;
wherein the requested communication comprises a recorded voice message.

22. The method as recited in claim 20, further comprising:
formatting the requested communication according to each identified communication option;
updating each identified record to indicate that the requested communication has been delivered; and
sending instructions to the client system to cause the displayed organizational tree to reflect that the requested communication has been delivered.

23. The method as recited in claim 13, wherein the one or more properties that match the criteria of the selected filter comprise one or more properties defining an attribute of the related member's sales activities.

24. The method as recited in claim 23, wherein the attribute comprises one of active, autoship, qualified, or personally enrolled.

25. The method as recited in claim 13, further comprising:
after sending the set of subsequent instructions to the client system, receiving a change to a first member's one or more properties that cause the first member's properties to match the criteria of the previously changed filter; and
without receiving a request from the client system, sending new instructions to the client system that enable the client system to display the first member in the same manner as the related members in the subclass.

26. At a client system in a computerized environment comprising the client and one or more servers, a computer program product comprising one or more non-transitory computer readable media having computer-executable instructions stored thereon that, when executed, cause one or more processors in the client system to perform a method comprising:
sending one or more requests to a server system to view related members of an organization, wherein each related member has a direct relationship with at least one other related member in the organization, and wherein each related member also includes one or more properties which are independent of the direct relationship;
receiving a set of initial instructions from the server system that enable the client system to render an initial view of an organizational tree corresponding to the related members, wherein the set of initial instructions includes one or more filter controls for filtering the initial view of the organizational tree, wherein each filter control specifies criteria for identifying related members having one or more properties that match the criteria;
rendering the initial view of the organizational tree from the set of initial instructions;
receiving a user request through a displayed user interface that changes one of the filter controls thereby requesting to view a subclass of the related members in the organizational tree comprising each related member having the one or more properties that match the criteria specified by the changed filter;
in response to the change in the filter control, sending one or more requests to the server system to view a filtered view of the organizational tree;
receiving a set of subsequent instructions from the server system that enable the client system to render the filtered view of the organizational tree; and
rendering the filtered view of the organizational tree from the subsequent instructions, wherein the filtered view displays the subclass of the related members differently than the rest of the related members in the displayed organizational tree;
receiving user input that requests that a communication be sent to each member in the subclass, but not to any member that is not in the subclass; and
sending one or more requests to the server system to request that the communication be sent to each member in the subclass.

27. The computer-program product as recited in claim 26, wherein the initial and subsequent instructions comprise animation instructions for rendering in a client internet browser.

28. At a client system in a computerized environment comprising the client and one or more servers, a computer-implemented method of providing a highly functional, interactive organizational tree for use by an end-user, comprising:
sending one or more requests to a server system to view a portion of an organizational tree representing a hierarchical structure of the organization, wherein the portion comprises a plurality of related members of the organization, wherein each related member has a direct relationship with at least one other related member in the organization, and wherein each related member also includes one or more properties which are independent of the direct relationship;
receiving a set of initial instructions from the server system that enable the client system to render the portion of the organizational tree and one or more filter controls for filtering the portion of the organizational tree to view one or more subclasses of the plurality of related members, wherein each filter comprises criteria for identifying a subclass comprised of each member in the plurality of related members in the portion that contains one or more properties that match the criteria;
receiving a user request through a displayed user interface that selects one of the filter controls to filter each member of the subclass associated with the selected filter;
sending one or more requests to the server system for a set of subsequent instructions for rendering the portion of the organizational tree with the filter criteria applied; and
receiving the set of subsequent instructions that enable the client system to render the portion of the organizational tree with the filter criteria applied such that each member of the subclass associated with the selected filter are displayed differently than members of the plurality of related members that are not included in the subclass.

* * * * *